United States Patent
Yang et al.

(10) Patent No.: US 11,977,818 B2
(45) Date of Patent: May 7, 2024

(54) METHOD FOR IDENTIFYING WET CLUTCH DESIGN REQUIREMENTS BASED ON STOCHASTIC SIMULATIONS

(71) Applicant: FORD GLOBAL TECHNOLOGIES, LLC, Dearborn, MI (US)

(72) Inventors: Hang Yang, Ann Arbor, MI (US); Huanyi Shui, Ann Arbor, MI (US); Yijing Zhang, Canton, MI (US); Hiral Jayantilal Haria, Ypsilanti, MI (US); Bradley Dean Riedle, Northville, MI (US); Yuji Fujii, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 698 days.

(21) Appl. No.: 17/181,379

(22) Filed: Feb. 22, 2021

(65) Prior Publication Data
US 2022/0269834 A1 Aug. 25, 2022

(51) Int. Cl.
*G06F 30/10* (2020.01)
*G06F 30/27* (2020.01)
*G06N 7/01* (2023.01)
*G06F 111/20* (2020.01)

(52) U.S. Cl.
CPC .............. *G06F 30/10* (2020.01); *G06F 30/27* (2020.01); *G06N 7/01* (2023.01); *G06F 2111/20* (2020.01)

(58) Field of Classification Search
CPC ............ G06F 30/10; G06F 30/27; G06N 7/01
USPC ............................................................ 703/6
See application file for complete search history.

(56) References Cited

U.S. PATENT DOCUMENTS

| | | |
|---|---|---|
| 5,742,917 A | 4/1998 | Matsuno |
| 6,154,702 A | 11/2000 | Fodor et al. |
| 6,640,178 B2 | 10/2003 | Wakamatsu et al. |
| 7,203,578 B2 | 4/2007 | Kuang et al. |
| 7,920,950 B2 | 4/2011 | Nihanda |
| 8,775,044 B2 | 7/2014 | Teslak et al. |
| 8,998,771 B2 | 4/2015 | Pietron et al. |
| 9,108,614 B2 | 8/2015 | Doering et al. |
| 9,258,284 B2 | 2/2016 | Tanaka |
| 9,423,022 B2 | 8/2016 | Turner et al. |
| 9,512,889 B2 | 12/2016 | Pietron et al. |
| 9,551,415 B2 | 1/2017 | Fodor et al. |
| 10,571,022 B2 | 2/2020 | Meyer et al. |
| 11,209,054 B1 | 12/2021 | Zhang et al. |

(Continued)

FOREIGN PATENT DOCUMENTS

| | | |
|---|---|---|
| CN | 113217619 A | 8/2021 |
| FR | 2947600 A3 | 1/2011 |
| WO | 02055903 A2 | 7/2002 |

OTHER PUBLICATIONS

Wu et al. discloses (a target torque estimation for gearshift in dual clutch transmission with uncertain parameters, (20 pages)). (Year: 2007).*

*Primary Examiner* — Andre Pierre Louis
(74) *Attorney, Agent, or Firm* — Vincent Mastrogiacomo; Brooks Kushman P.C.

(57) ABSTRACT

A method of producing a disconnect clutch includes producing a disconnect clutch, configured to selectively connect an engine and an electric machine, such that the disconnect clutch exhibits a clutch transfer function that causes a transmission output shaft torque variability that is less than a predetermined threshold during a simulated starting of the engine using the electric machine.

14 Claims, 5 Drawing Sheets

(56) References Cited

U.S. PATENT DOCUMENTS

| | | |
|---|---|---|
| 11,498,566 B2 | 11/2022 | Chen et al. |
| 2010/0222961 A1 | 9/2010 | Dlugoss |
| 2013/0153353 A1* | 6/2013 | Teslak .................... F16H 61/04 |
| | | 192/48.1 |
| 2014/0195082 A1 | 7/2014 | Takamura et al. |
| 2014/0342869 A1 | 11/2014 | Maurer et al. |
| 2015/0066264 A1 | 3/2015 | Wang et al. |
| 2015/0274146 A1 | 10/2015 | Doering et al. |
| 2016/0031431 A1 | 2/2016 | Johri et al. |
| 2016/0159352 A1 | 6/2016 | Kim et al. |
| 2018/0022353 A1 | 1/2018 | Thompson et al. |
| 2018/0245692 A1 | 8/2018 | Meyer et al. |
| 2018/0251118 A1 | 9/2018 | Gaither |
| 2019/0096146 A1 | 3/2019 | Terashima et al. |
| 2019/0176798 A1 | 6/2019 | Ford et al. |
| 2019/0283766 A1 | 9/2019 | Jensen et al. |
| 2020/0202057 A1 | 6/2020 | Chen et al. |
| 2021/0291807 A1 | 9/2021 | Hayasaka et al. |
| 2022/0269834 A1 | 8/2022 | Yang et al. |

\* cited by examiner

METHOD FOR IDENTIFYING WET CLUTCH DESIGN REQUIREMENTS BASED ON STOCHASTIC SIMULATIONS

TECHNICAL FIELD

The present disclosure relates to wet clutches in automotive vehicles.

BACKGROUND

A hybrid-electric powertrain includes an engine and an electric machine. The torque and power produced by the engine and/or the electric machine can be transferred through a transmission to the driven wheels to propel the vehicle. A traction battery supplies energy to the electric machine. The hybrid powertrain is also capable of performing regenerative braking where the electric machine brakes the vehicle by converting mechanical power into electrical power to recharge the battery. A disconnect clutch may be used to selectively connect the engine and the electric machine.

SUMMARY

According to one embodiment, a method of configuring a disconnect clutch configured to selectively couple an engine to an electric machine includes generating a baseline clutch transfer function associated with the disconnect clutch that represents a relationship between clutch torque capacity and clutch pressure. The method further includes simulating starting of the engine using the electric machine based on the baseline clutch transfer function to determine an estimated variability of transmission output shaft torque and, in response to the estimated variability of the transmission output shaft torque exceeding a threshold, reducing a slope of the baseline clutch transfer function based on a difference between the estimated variability of transmission output shaft torque and the threshold to generate a second clutch transfer function. The method also includes simulating starting of the engine using the electric machine based on the second clutch transfer function to determine a second estimated variability of the transmission output shaft torque and, in response to the second estimated variability of the transmission output shaft torque being less the threshold, configuring a disconnect clutch to exhibit the second clutch transfer function.

According to another embodiment, a method of producing a disconnect clutch includes producing a disconnect clutch, configured to selectively connect an engine and an electric machine, such that the disconnect clutch exhibits a clutch transfer function that causes a transmission output shaft torque variability that is less than a predetermined threshold during a simulated starting of the engine using the electric machine.

According to yet another embodiment, a method of configuring a disconnect clutch configured to selectively couple an engine to an electric machine includes, in response to an engine-start simulation based on a baseline clutch transfer function producing a transmission output shaft torque variability that exceeds a predetermined threshold, reducing a slope of the baseline clutch transfer function based on a difference between the variability and the threshold to generate a second clutch transfer function. The method further includes, in response to another engine-start simulation based on a second clutch transfer function producing another transmission output shaft torque variability that is less than the predetermined threshold, configuring a disconnect clutch to exhibit the second clutch transfer function.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
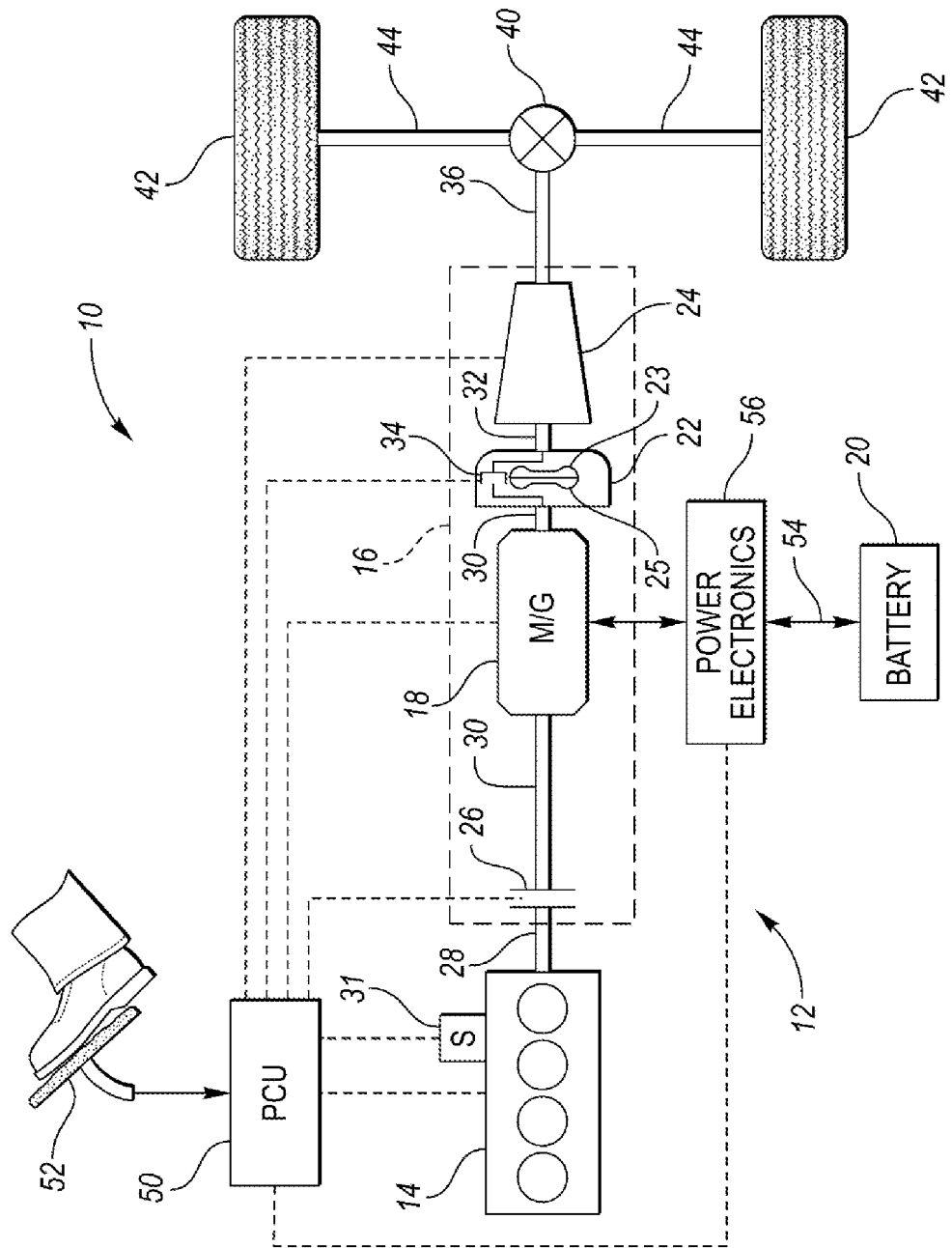
FIG. 1 is a schematic of a hybrid electric vehicle according to one embodiment.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, the transmission 16 includes an electric machine such as an electric motor/generator (M/G) 18, an associated traction battery 20, a torque converter 22, and a multiple step-ratio automatic transmission or gearbox 24. The engine 14, M/G 18, torque converter 22, and the automatic transmission 16 are connected sequentially in series, as illustrated in FIG. 1. For simplicity, the M/G 18 may be referred to as a motor.

The engine 14 and the M/G 18 are both drive sources for the HEV 10 and may be referred to as actuators. The engine 14 generally represents a power source that may include an internal-combustion engine such as a gasoline, diesel, or natural gas powered engine. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

The disconnect clutch 26 is a wet clutch that includes a clutch pack having a plurality of clutch discs and pressure plates. The clutch 26 may be hydraulically controlled by applying fluid pressure to a piston. The piston compresses the clutch pack, based on the fluid pressure, to transfer torque (also know as clutch torque capacity) across the clutch.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously, drivably connected to the shaft 30, whereas the engine 14 is drivably connected to the shaft 30 only when the disconnect clutch 26 is at least partially engaged. When the disconnect clutch 26 is locked (fully engaged), the crankshaft 28 is fixed to the shaft 30.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the starter motor 31 is a belt-integrated starter generator (BISG). In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine 14 to the M/G 18 to allow the engine to provide drive torque.

The engine 14 may also be started by the M/G 18. In some embodiment, the vehicle may be programmed to start the engine 14 using the starter 31 in some situations and with the M/G 18 in others. Alternatively, the starter motor 31 may not be provided and the engine 14 is started by the M/G 18 in all situations. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller 23 fixed to M/G shaft 30 and a turbine 23 fixed to a transmission input shaft 32. The torque converter 22 provides a hydraulic coupling between shaft 30 and transmission input shaft 32. The torque converter 22 transmits power from the impeller 23 to the turbine 25 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and the launch clutch 34 (which may be a torque converter bypass clutch) is generally referred to as a downstream clutch.

The gearbox 24 may include gear sets, such as planetary gear sets, that are selectively placed in different gear ratios by selective engagement of friction elements such as clutches and brakes to establish the desired multiple discrete or step drive ratios. For simplicity, the gear ratios may be referred to as gears, i.e., first gear, second gear, etc. The friction elements are controllable through a shift schedule that connects and disconnects certain elements of the gear sets to control the speed and torque ratios between a transmission output shaft 36 and the transmission input shaft 32. The gearbox 24 may have six speeds including first through sixth gears. In this example, sixth gear may be referred to as top gear. First gear has the lowest speed ratio and the highest torque ratio between the input shaft 32 and the output shaft 36, and top gear has the highest speed ratio and the lowest torque ratio. The gearbox 24 is automatically shifted from one ratio to another based on various vehicle and ambient operating conditions by an associated controller, such as a powertrain control unit (PCU). The gearbox 24 then provides powertrain-output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes one or more controller 50 such as a powertrain control unit (PCU), an engine control module (ECM), and a motor control unit (MCU). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel-injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), slowing or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. This may be referred to as driver-demanded torque. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive torque (drive torque) or negative torque (regenerative braking) to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. The M/G 18 may be referred to as providing negative torque when acting as a generator.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

A wet clutch, such as the disconnect clutch 26, may be controlled by a hydraulic actuator such as a hydraulic piston. Wet clutches may also be utilized in automatic shifting of a transmission and the like. The torque capacity of a wet clutch is controlled by commanding fluid to the associated piston to increase and decrease pressure applied to the clutch plates and discs. A mathematical relationship between pressure of the hydraulic actuator and the torque capacity of the wet clutch may be referred to as clutch transfer function. Such a transfer function may be utilized to control the clutch torque. In practice, it is difficult to determine the requirements on clutch transfer function shape and corresponding variability early in vehicle development because clutch behaviors are application-specific. For example, clutch transfer function is highly sensitive to hydraulic actuator pressure profiles such as a time constant of initial pressure rise. It also exhibits variability depending on operating conditions such as temperature and slip speed, even if the same pressure profile is commanded. This variability in turn affects the quality and the consistency of engine restart. The time-dependent effect of clutch variability on engine restart quality is further compounded by torque variability of other components of the powertrain such as the engine and the M/G as well as uncertainty in driver action such as pedal position. The uncertainties from multiple sources dynamically interact with each other in a complex manner while they propagate through the powertrain. They may amplify or suppress the effects of clutch torque uncertainty on engine restart quality. In current practice, there are no practical design methods to quantify the time-dependent effects of clutch torque uncertainties on engine restart quality. Conventional deterministic system simulations struggle to predict complex interactions of various uncertainties to determine the requirements of clutch torque transfer function and corresponding variability at early vehicle development process for consistently delivering a target engine restart quality. Accordingly, in the absence of reliable clutch design specifications for each application, clutch hardware is tested in a vehicle to evaluate engine restart quality through inefficient and costly trial- and error process. Clutch designs are modified as often as required until a target restart quality is met in vehicle testing under the presence of other uncertainties.

To solve these and other problems, methods of this disclosure iteratively determine the clutch torque controllability requirements (for example, in the form of a clutch transfer function) without vehicle-level testing, while accounting for the variability of other system components and control actions. The requirements are cascaded to component engineers as clutch design specifications at early vehicle development process, enabling them to select suitable friction material and features to reduce the amount of costly design iterations late in the development process.

The clutch torque transfer function specifies the relationship between clutch torque and clutch actuator pressure. The clutch transfer function may be obtained by fitting a mathematical function to test data using a parametric regression method, such a linear regression. The clutch control variability may be defined as a variance of the regression representation of the clutch transfer function. The clutch control variability may be defined as an assumed variance of the regression representation of the clutch transfer based on prior knowledge of the component behaviors. The clutch torque transfer function variability may be expressed by means of a probabilistic non-parametric representation of mean and variance according to Gaussian Process Regression (GPR). A transient simulation may be conducted by means of a stochastic method such as generalized Polynomial Chaos (gPC) to probabilistically determine the time-dependent effects of clutch torque uncertainty (variability), coupled with variability of other system components and control actions, on engine restart quality. The methods may iteratively determine the requirements of the clutch torque transfer function variability to meet a target engine restart quality under the presence of other system uncertainties. A similar iterative method can be applied to determine control variability requirements of any other components to meet system-level performance requirements.

Figure 2:
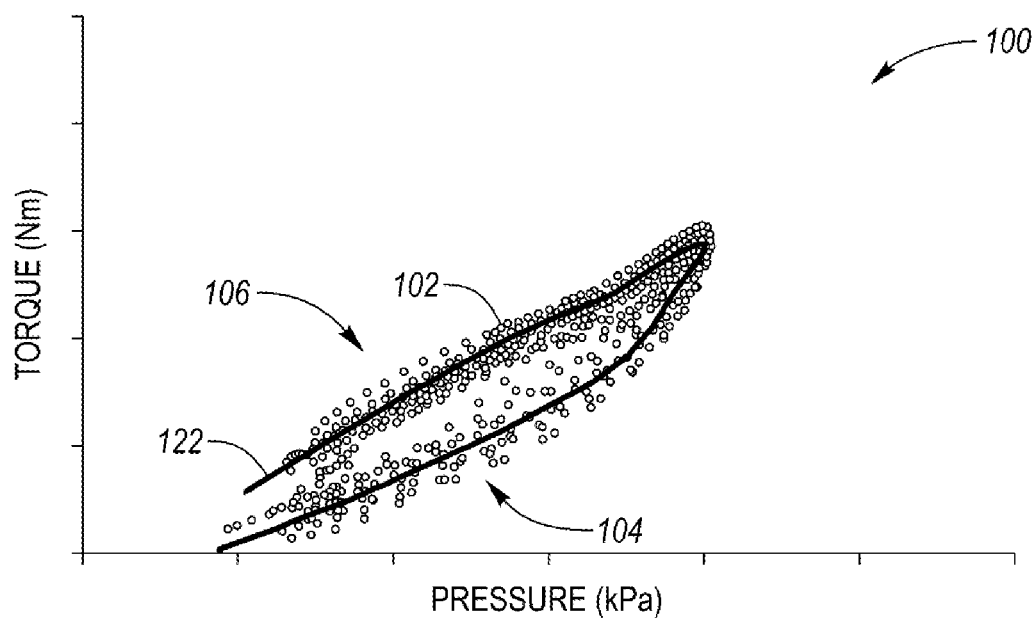
FIG. 2 is a plot showing of test data for a clutch and a torque transfer function according to one or more embodiments.

FIG. 2 is a plot 100 of test data for a wet clutch, such as an engine disconnect clutch. As shown by the data points 102, the clutch torque varies for a same commanded pressure. This is known as clutch torque variation or clutch torque variation specification. The variation is somewhat grouped with a lower grouping of data points 104 and an upper grouping 106. The lower grouping 104 represents the data collected during the engagement of the clutch while the upper grouping 106 represents the data collected during the disengagement of the clutch. The variation of the clutch torque is dependent upon the design of the clutch and some clutches have tighter variations than others. The variation of the clutch torque also depends on hydraulic pressure profiles and operating conditions such as temperature.

Figure 3:
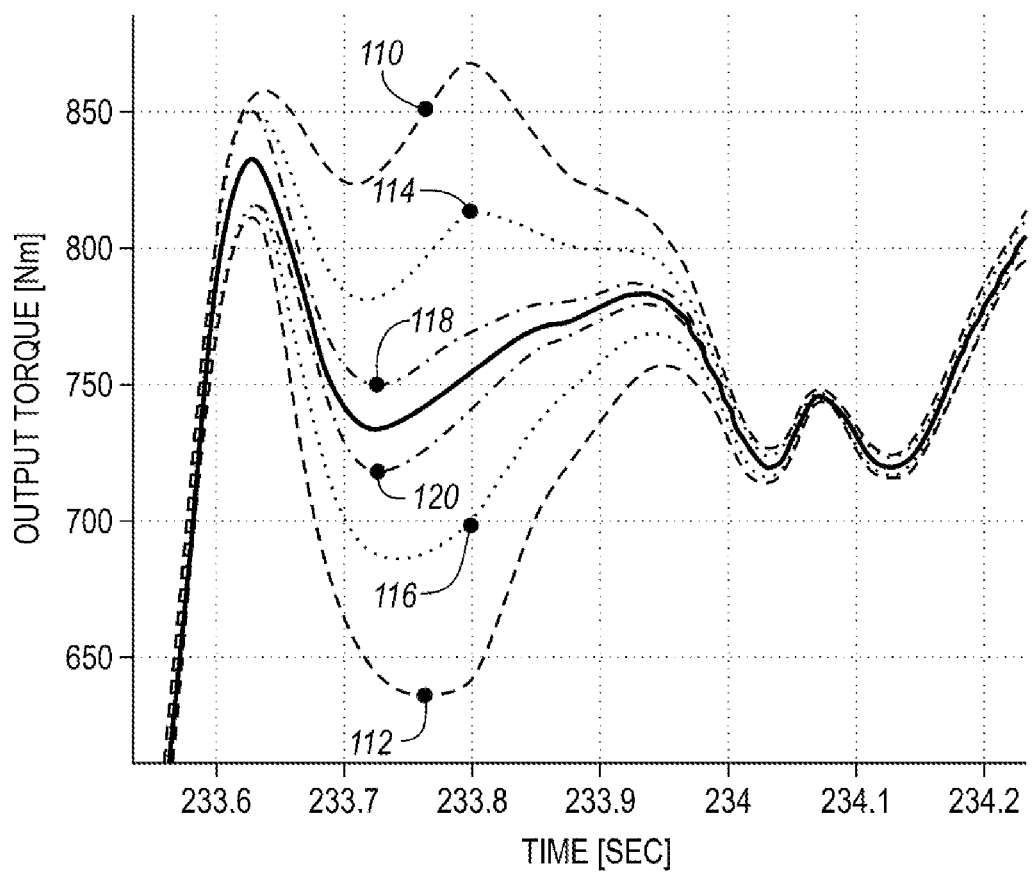
FIG. 3 is a plot showing several iterations of engine-start simulations.

Referring to FIG. 3, the variation of clutch torque is further compounded by other variations in the powertrain to create even larger variations of output torque at the transmission output shaft for example. The example plot shows the output torque data for different iterations, which represent different clutches, each having different standard deviations or specification of clutch torque transfer function variation. The plots 110, 112 are for a first clutch with a standard deviation or torque variation specification of 10 (e.g., a clutch torque variation of 10 Nm around the mean of the transfer function), the plots 114, 116 are for a second clutch with a torque variation specification of 5 (e.g., a clutch torque variation of 5 Nm around the mean of the transfer function), and the plots 118, 120 are for a third clutch with a torque variation specification of 1 (e.g., a clutch torque variation of 1 Nm around the mean of the transfer function). The torque uncertainties from the engine and the motor are set to 5 Nm and 1 Nm, respectively, in the example. A statistical variation of overall system stiffness and damping coefficients is set to 20% around nominal values in the example. The overall output variation for the first clutch is 200 Nm, the overall output variation for the second clutch is 120 Nm, and the overall output variation for the third clutch is 30 Nm. Thus, it is clear that small changes in the clutch torque variation result in large changes in the overall output torque variation, when clutch behavior is compounded with uncertainties from engine torque, motor torque, and driver pedal position. Vehicle programs may have an output torque variability goal that the clutch (and other vehicle components) must meet. For example, if the program limit is 125 Nm, then clutches 2 and 3 are suitable for the vehicle program but clutch 1 is not. The inclusion of dynamic interactions between various uncertainties enables accurate determination of clutch design requirements for meeting the output shaft torque variability target.

Referring back to FIG. 2, the data points 102 may be used to calculate a clutch transfer function 122. The clutch transfer function may be determined using different methodologies as explained below. In FIG. 2, the clutch transfer function 122 is calculated using a Gaussian Process Regression (GPR). The GPR model may be simplified before being later used in a gPC simulation or the GPR model may be directly used in the gPC. The shape of the clutch transfer function may be adjusted during iterations, for example, adjusting the shape to evaluate effects of hysteresis and variance. As an alternative to GPR, a simple parametric regression, such as linear fitting with RMS variance, may be used in gPC-based iterative method. This is shown, for example, in FIG. 4, which has a linear transfer function 124.

Methods may be represented by flow charts or similar diagrams in one or more figures. These figures provide representative methods or processes that may be implemented to test and analyze the performance of wet clutches. The various steps illustrated may be performed in the sequence illustrated, in parallel, in a different sequence, or in some cases omitted. Although not always explicitly illustrated, one of ordinary skill in the art will recognize that one or more of the illustrated steps may be repeatedly performed depending upon the particular process.

Figure 5:
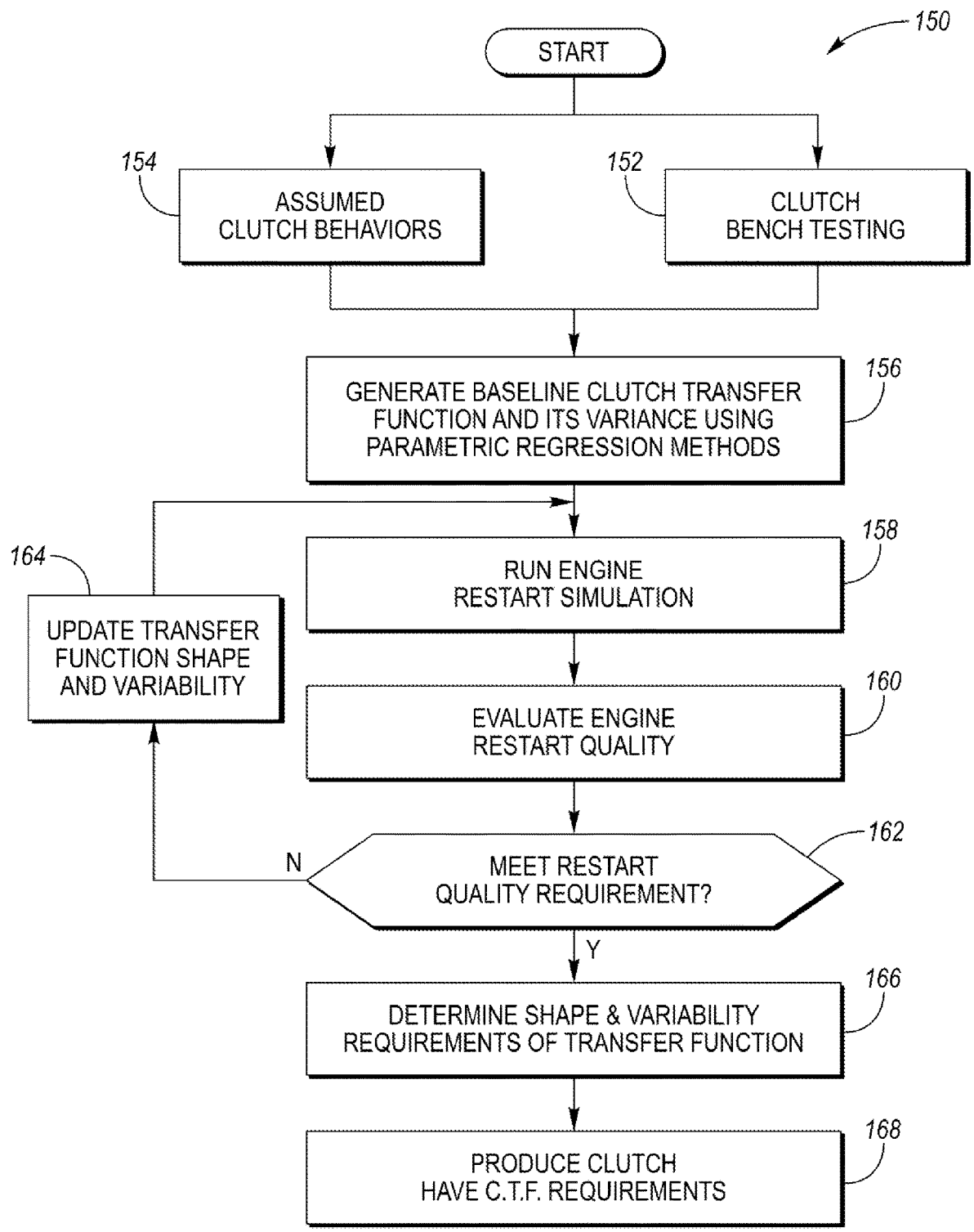
FIG. 5 is a flow chart of a method for modeling and an analyzing wet clutches.
Figure 6:
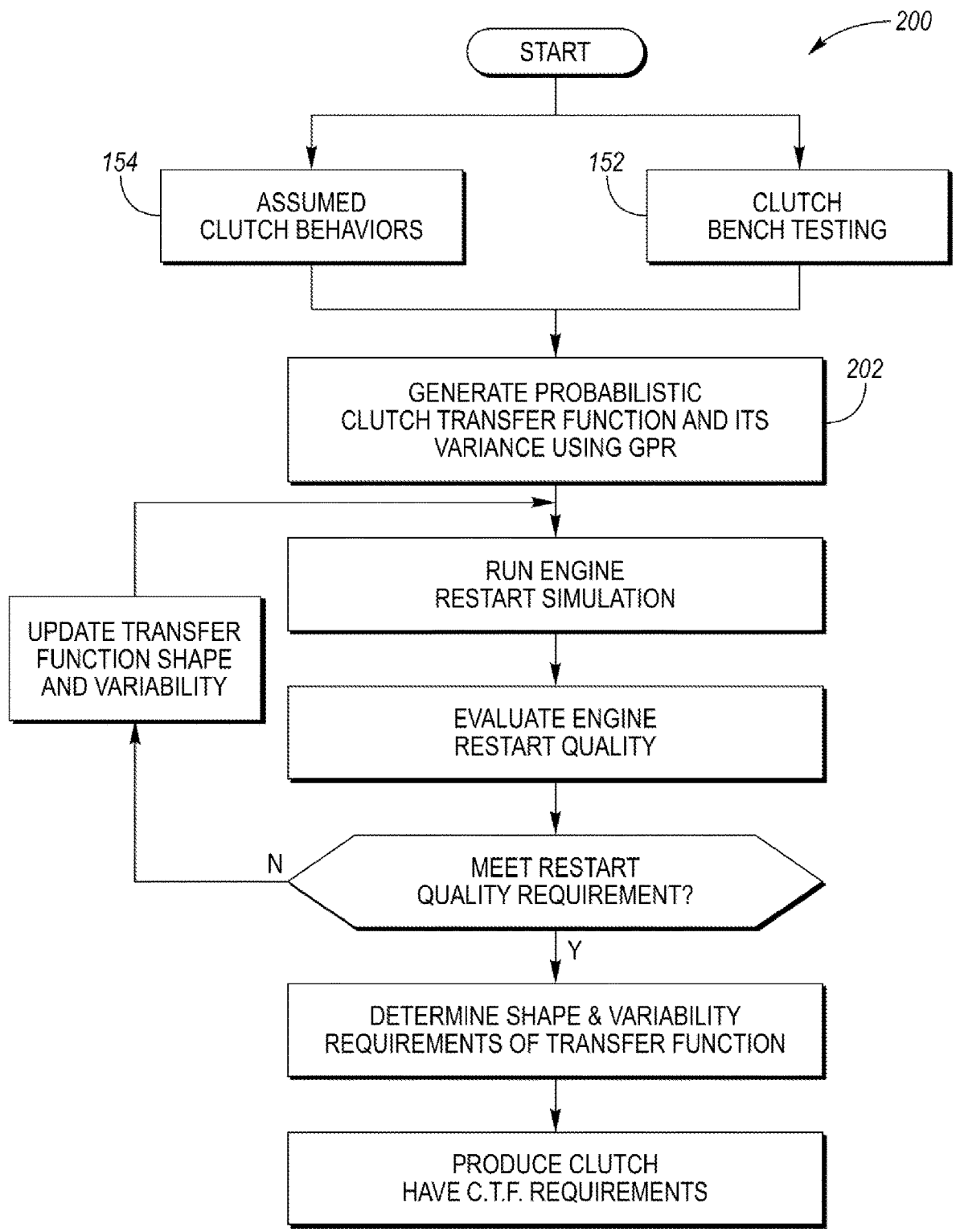
FIG. 6 is a flow chart of another method for modeling and an analyzing wet clutches.

Referring to FIG. 5, a method 150 of determining shape and variability requirements of a clutch transfer function for a given clutch without vehicle testing. The method 150 includes bench testing the clutch at operation 152. The bench test of operation 152 develops data points of clutch torque for a given applied pressure, e.g., as shown in FIG. 2. Alternative to conducting clutch bench testing, at operation 154, assumptions regarding clutch behavior are developed based on prior design knowledge. These assumptions may include clutch torque transfer function behaviors and corresponding uncertainties for a given clutch design.

Figure 4:
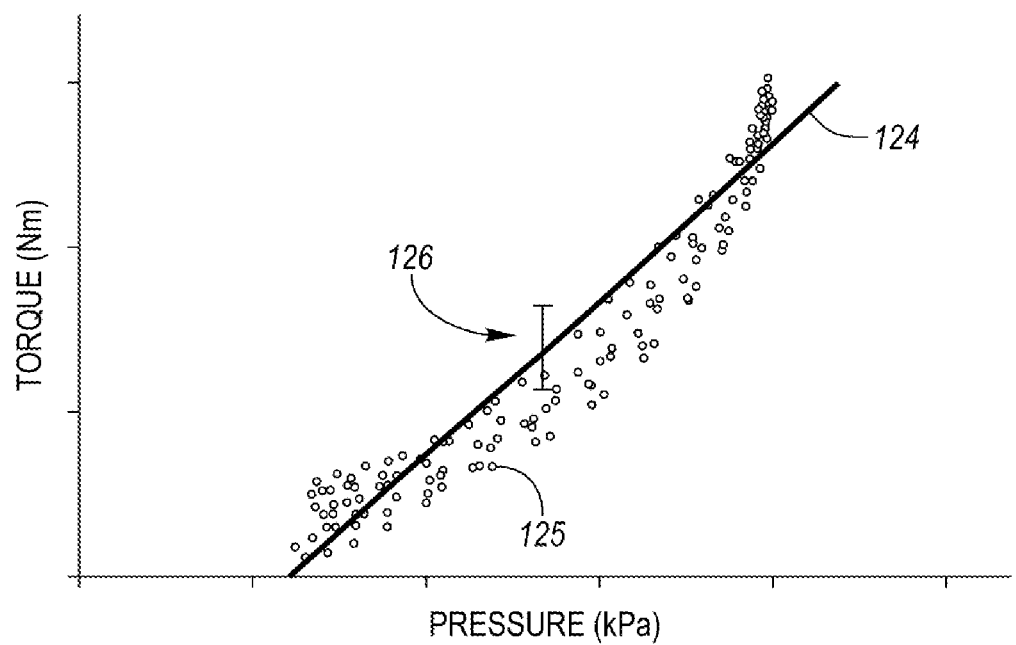
FIG. 4 is a plot showing of test data for a clutch and a torque transfer function according to one or more embodiments.

At operation 156, the test data generated at operation 152 and the assumptions of operation 154 are used to generate a baseline clutch transfer function and its variance using parametric regression methods. The transfer function 124 shown in FIG. 4 is an example of a transfer function generated at operation 156. The transfer function 124 is based on the data points 125 collected during the bench testing of operation 152. In addition to the shape of the transfer function, a variance 126 is also determined at operation 156.

At operation 158, an engine restart simulation is conducted. The restart simulation may utilize a gPC (generalized Polynomial Chaos) method, explicitly accounting for various sources of uncertainties simultaneously and computing their dynamic interactions. The behavior of a dynamics system, such as MHT engine restart process, may be conventionally modeled using a set of deterministic equations. In Equation 1, x(t) represents the system states such as output shaft torque, u(t) represents the system inputs such as clutch torque, engine torque and motor torque, and t is time. The deterministic equations can accurately describe the system behavior if there is no uncertainty.

$$\dot{x}(t)=f(x(t),u(t),t) \quad \text{Eq. 1}$$

However, the deterministic equations become inadequate if uncertainties exist in the model f or in the system inputs u(t). The system with uncertainties can be modeled using a set of stochastic equations such as Equation 2. In Equation 2, z is the set of random variables that represent the uncertainties.

$$\dot{x}(t,z)=f(x(t,z),u(t,z),t,z) \quad \text{Eq. 2}$$

Running simulations to solve these stochastic system equations using traditional sampling methods (e.g., Monte Carlo) is often computationally expensive. Therefore, using gPC may be more practical for solving Eq. 2. Generalized polynomial chaos is a spectral decomposition method that can significantly reduce this computational expense by utilizing polynomial approximation to decompose the stochastic system as shown in Equation 3:

$$x(t,z) \approx \Sigma_{i=0}^{M} x_i(t)\Phi_i(z) = x_0(t)\Phi_0(z) + \ldots + x_M(t)\Phi_M(z) \quad \text{Eq. 3}$$

Here, where M is a user-defined order of the decomposition, $x_i(t)$ is a set of gPC coefficients, and $\Phi_i(z)$ is a set of orthogonal polynomial bases. The gPC coefficients are the deterministic dynamics of the system that are independent from the random uncertainties, and the polynomial bases are the set of random variables that are independent of time.

The decomposition in Equation 3 are substituted into the system model in Equation 2 and the Stochastic Galerkin Projection is applied to reconstruct the system equation with respect to the orthogonal polynomial bases as shown in Equation 4, where $\Phi_i(z)$ is each of the polynomial bases in Equation 3.

$$\langle \Sigma_{i=0}^{M} \dot{x}_i(t)\Phi_i(z), \Phi_j(z)\rangle = \langle f, \Phi_j(z)\rangle,$$
$$1=0, 1, 2, \ldots, M \quad \text{Eq. 4}$$

A set of deterministic differential equations can be found for the gPC coefficients in Equation 3 as shown in Equation 5:

$$\frac{dx_i(t)}{dt} = \frac{\langle f, \Phi_i(z)\rangle}{\langle \Phi_i^2(z)\rangle} \quad \text{Eq. 5}$$

The simulation results can be obtained in the form of statistical moments, e.g., mean and variance using Equation 6 and 7. (In the engine restart simulation, the mean is the output torque and the variance is its variation.)

$$\text{mean}=x_0(t) \quad \text{Eq. 6}$$

$$\text{variance}=\Sigma_{i=1}^{M} x_i^2(t) \quad \text{Eq. 7}$$

Here, the mean $x_0(t)$ is the first gPC coefficient in Equation 3 and the variance is the sum of the square of the rest of the gPC coefficients in Equation 3. If the uncertainties z in Equation 2 approach zero, the mean values in Equation 6 would approach the deterministic solution of Equation 1 and the variance values in Equation 7 would approach zero. In gPC, the polynomial bases can be computed ahead of time and stored in memory. Only the gPC coefficients needs to be computed when running a stochastic simulation. The necessary polynomial bases values can be extracted from memory as needed. If the uncertainties do not change significantly, the pre-computed polynomial bases can be reused. Therefore, the computational cost associated with running stochastic simulations can be orders-of-magnitude lower than traditional methods (e.g., Monte Carlo) that require sampling. FIG. 3 illustrates example outputs of the engine start during simulations such as those preformed in operation 158. Specifically, the solid line shows the mean value of transmission output torque which is calculated according to Eq. (6). Each pair of dashed lines such as 110 and 112 indicates torque variability at a 95% confidence level that is calculated based on the variance according to Eq. (7).

At operation 160, the output of operation 158 is evaluated. One parameter that is evaluated is the output variation. In FIG. 3, which shows three iterations, the output variation within 95% confidence level is the differences between the peaks. For example, the output variation for the first iteration is the difference between plots 110 and 112, which is 200 Nm. In other embodiments, the gPC simulation may generate vehicle accelerations as the output and variations of acceleration are evaluated.

As discussed above, vehicle programs may set a maximum permissible output torque variability that the clutch must satisfy as a consistency metric of engine restart quality requirement. At operation 162, the output torque variation of the engine restart simulation is compared to the program threshold to determine if the clutch design with a certain transfer function requirement meets the restart quality requirement. For example, if the output torque variation threshold at 95% confidence interval is 130 Nm, then iteration 1, with a 200 Nm output variation, does not pass. In other words, the clutch design in iteration 1 with 10 Nm of torque transfer function variability results in 200 Nm variation of output torque at 95% confidence level for inconsistent engine restart quality. Control then passes to operation 164 where the transfer function shape and variability is updated.

For example, the slope of the transfer function, which represents clutch control gain, may be reduced to make the clutch behavior less sensitive to pressure variation. The variability of clutch transfer function may be tightened by a pre-determined amount to make the clutch behavior more consistent.

The updated transfer function is then simulated at operation 158 and then revaluated at operation 160. For example, the updated transfer function may be iteration 2 shown in FIG. 3, which has an output variation between plots 114, 116 of 120 Nm. The output variation of the latest simulation is again compared to the threshold at operation 162. Here, the output variation of 120 Nm is less than the requirement of 130 Nm. Therefore, the second iteration meets the restart quality requirement. If vehicle program requires a tighter output torque variation such as 50 Nm, the process moves to iteration 3 after adjusting clutch torque transfer function shape and variability at operation 164.

Once the engine restart quality requirement, such as output torque variation threshold, is met at operation 162, the method then advances to operation 166 where the shape and variability requirements of the clutch torque transfer function are finalized. Those requirements are cascaded to component engineers as clutch design specifications at early vehicle development process, enabling them to deliver clutch hardware that meets system-level performance when it is integrated into a vehicle. That is, a clutch is then configured according the updated clutch transfer function. The configuring may include designing a clutch to exhibit the clutch transfer function. The designing may include selecting a clutch friction material based on the clutch transfer function and/or modifying the groove design. Once the clutch is designed, it may be tested to determine if it exhibits the desired clutch transfer function. If no, the clutch design may be discarded and re-designed to meet the clutch transfer function.

FIG. 7 illustrates an alternative method 200 that is similar to the method 150, except that gaussian process regression (GPR) is used to generate the transfer function. For brevity, only operation 202 will be explained as the other steps are similar to the method 150. In some instances, GPR may be better than parametric regression.

A parametric regression method may assume the shape of function. For example, it fits a predefined parametric function $T=\theta_0+\theta_1 P$ to a set of clutch test data $[(T_n, P_n), n=0, \ldots N]$, where T is clutch torque and P is applied pressure. The parameters $\theta_0$ and $\theta_1$ are determined using a least square method to minimize RMS (Root Mean Square) variance. Once the regression parameters are identified, $T=\theta_0+\theta_1 P$ is used to compute clutch torque for a given pressure while the RMS variance represent torque uncertainty. The parametric representation such as $T=\theta_0+\theta_1 P$ is suitable for those applications where the clutch behaviors follow known functional characteristics. However, it inherently limits the torque accuracy when the clutch deviates from the assumed behaviors. For example, a linear representation of $T=\theta_0+\theta_1 P$ cannot capture non-linear hysteresis behaviors illustrated in FIG. 2. When the regression function does not closely represent mean clutch behaviors, its RMS variance is also not the accurate measure of clutch torque uncertainty. For example, RMS or error bar illustrated in FIG. 3 does not adequately cover the sample data points. Unlike a parametric model, a non-parametric approach such as GPR fits a probabilistic representation to a set of clutch test data $[(T_n, P_n), n=0, \ldots N]$ using a kernel function $k(\cdot)$. Because there is no assumption of specific parametric form, GPR leverages the kernel function to learn a variety of non-linear behaviors, including hysteresis from test data. Once the regression training process is completed with the test data, the GPR model is used to calculate clutch torque and corresponding variance for a given pressure value. This enables a representation of torque uncertainties as a function of pressure, unlike a single RMS representation of uncertainties in parametric regression. Compared to parametric regression (e.g., linear regression), GPR may be more capable of learning nonlinearity and hysteresis in the data and provide probabilistic torque estimation to clutch torque variability.

Turning now to operation 202, noise on each data set (clutch torque) is considered, using Equation 8 where $T_n=T(P_n)$, $n=1 \ldots N$ and N is the total number of test data. $\epsilon_n$ is random noise $\mathcal{N}(0, \sigma^2)$ that is independent for each observation. $T_n$ and $\sigma$ is the noise variance. $P \in R^Q$ is the input vector (pressure). Q is the total dimension of the input vector (in this example there are two inputs: pressure and the first derivative of pressure). The $\hat{T}_n$ is the clutch torque with noise and is assumed to follow Gaussian Distribution $$\hat{T}_n = T_n + \epsilon_n \qquad \text{Eq. 8}$$

To estimate the clutch torque from pressure, it can be translated as estimating the marginal distribution $p(\hat{T})$, which can be expressed as:

$$p(\hat{T}) = \int p(\hat{T}|T)p(T)dT = \mathcal{N}(\hat{T}|0,C) \qquad \text{Eq. 9}$$

where $T=(T_1, \ldots T_N)^T$ and $\hat{T}=(\hat{T}_1, \ldots \hat{T}_N)^T$. Note that the lower-case italic p denotes probability distribution while the upper case $P_n$ represent input vector (pressure and its derivative). The covariance matrix C is shown in Equation 10, where k is the kernel function. $P_n$ is the $n^{th}$ pressure value, $P_m$ is the $m^{th}$ pressure value, $\beta$ is a hyperparameter representing the precision of the noise and $\delta_{nm}$ is a unit impulse function.

$$C(P_n, P_m) = k(P_n, P_m) + \beta^{-1}\delta_{nm} \qquad \text{Eq. 10}$$

One benefit of using the kernel function is its flexibility to describe nonlinearity in data. Therefore, it is a suitable method to model clutch torque accurately. An example of kernel function is shown in Equation 11.

$$k(P_n, P_m) = \theta_0 \exp\left(-\frac{\theta_1}{2}\|P_n - P_m 1\|^2\right) + \theta_2 + \theta_3 P_n^T P_m \qquad \text{Eq. 11}$$

The parameters $\theta_k$, k=0, 1, 2, 3 can be solved with gradient-based methods by maximizing the log posterior:

$$\ln p(\hat{T}|\theta) = -\frac{1}{2}\ln|C_N| - \frac{1}{2}\hat{T}^T C_N^{-1}\hat{T} - \frac{N}{2}\ln(2\pi) \qquad \text{Eq. 12}$$

$$\frac{\partial}{\partial \theta_i}\ln p(\hat{T}|\theta) = -\frac{1}{2}Tr\left(C_N^{-1}\frac{\partial C_N}{\partial \theta_i}\right) + \frac{1}{2}\hat{T}^T C_N^{-1}\frac{\partial C_N}{\partial \theta_i}C_N^{-1}\hat{T} \qquad \text{Eq. 13}$$

Here, $p(\hat{T}|\theta)$ is the likelihood function, $\hat{T}^T$ is a transpose vector of $\hat{T}$, and $C_N$ is the N by N covariance matrix consists by the element $C(P_n, P_m)$. Estimating a clutch torque with the learnt GPR model given a new pressure value is equivalent to finding the conditional (predictive) distribution $p(\hat{T}_{N+1}|\hat{T}_N)$, where $\hat{T}_N=(\hat{T}_1, \ldots, \hat{T}_N)^T$ (test data). The conditional distribution $p(\hat{T}_{N+1}|\hat{T}_N)$ can be expressed as a Gaussian distribution with mean $m(P_{N+1})$ and variance $\sigma^2(P_{N+1})$, which represents clutch torque and the variability of the estimated torque, respectively. The estimated clutch torque is shown by Equation 14 and the variability of the clutch torque is shown by Equation 15. The vector k consists of $k(x_n, x_{N+1})$ for n=1, N, $k^T$ is a transpose vector of k, $C_N^{-1}$ is the inverse of $C_N$, and scalar $c_0=k(x_{N+1}, x_{N+1})+\beta^{-1}$. FIG. 2 illustrates an example clutch transfer function (mean value) 122 generated by GPR.

$$m(P_{N+1}) = k^T C_N^{-1}\hat{T} \qquad \text{Eq. 14}$$

$$\sigma^2(P_{N+1}) = c_0 - k^T C_N^{-1}k \qquad \text{Eq. 15}$$

The transfer function determined at operation 202 is then used in a gPC simulation to determine if the clutch meets the restart quality requirement as explained above. The mean $m(P_{N+1})$ and variance $\sigma^2(P_{N+1})$ are adjusted during the iterations to determine clutch transfer function requirements to meet the target engine restart quality metric.

The invented method uniquely couples GPR and/or gPC methods to represent clutch transfer function shape and variance in statistically evaluating engine restart quality in application with a wet disconnect clutch without vehicle testing. The disclosed methods iteratively determine clutch torque shape and variance requirements through a limited number of simulations, instead of running millions of deterministic simulations in Monte Carlo, or the like.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of configuring a disconnect clutch configured to selectively couple an engine to an electric machine, the method comprising:
   generating a baseline clutch transfer function having a corresponding torque variability specification associated with the disconnect clutch that represents a relationship between clutch torque capacity and clutch pressure;
   simulating starting of the engine using the electric machine based on the baseline clutch transfer function to determine an estimated variability of transmission output shaft torque;
   in response to the estimated variability of the transmission output shaft torque exceeding a threshold, reducing a slope of the baseline clutch transfer function and tightening the variability specification based on a difference between the estimated variability of transmission output shaft torque and the threshold to generate a second clutch transfer function;
   simulating starting of the engine using the electric machine based on the second clutch transfer function to determine a second estimated variability of the transmission output shaft torque; and
   in response to the second estimated variability of the transmission output shaft torque being less the threshold, configuring a disconnect clutch to exhibit the second clutch transfer function.

2. The method of claim 1, wherein the simulating starting of the engine includes calculating a mean of the transmission output shaft torque and a variance of the transmission output shaft torque.

3. The method of claim 2, wherein the simulating starting of the engine further includes a generalized Polynomial Chaos (gPC) simulation in which the mean is a first gPC coefficient and the variance is a sum of a square of all other gPC coefficienties.

4. The method of claim 1, wherein the baseline clutch transfer function and the clutch torque variability specification are generated using Gaussian Process Regression (GPR).

5. The method of claim 1 further comprising bench testing the disconnect clutch including applying pressure to the clutch and recording clutch torque capacity data.

6. The method of claim 5, wherein the baseline clutch transfer function and the clutch torque variability specification are based on the clutch torque capacity data.

7. The method of claim 1, wherein the configuring a disconnect clutch includes selecting a clutch friction material and plate geometry design based on the second clutch transfer function.

8. A method of configuring a disconnect clutch configured to selectively couple an engine to an electric machine, the method comprising:

performing an engine-start simulation using the electric machine based on a baseline clutch transfer function having a corresponding clutch torque variability specification;

in response to the engine-start simulation, producing a transmission output shaft torque variability that exceeds a predetermined threshold, reducing a slope of the baseline clutch transfer function and tightening the clutch torque variability specification based on a difference between the variability of the output shaft torque and the threshold to generate a second clutch transfer function; and in response to another engine-start simulation based on a second clutch transfer function producing another transmission output shaft torque variability that is less than the predetermined threshold, configuring a disconnect clutch to exhibit the second clutch transfer function.

9. The method of claim 8, wherein the transmission output shaft torque variability is based on a mean and a variance of transmission output shaft torque.

10. The method of claim 9, wherein the engine-start simulation includes a generalized Polynomial Chaos (gPC) simulation in which the mean is a first gPC coefficient and the variance is a sum of a square of remaining gPC coefficienties.

11. The method of claim 8, wherein the baseline clutch transfer function is based on Gaussian Process Regression (GPR).

12. The method of claim 8, wherein the clutch transfer functions represent relationships between clutch torque capacities and clutch pressures.

13. The method of claim 8, wherein the configuring a disconnect clutch includes selecting a clutch friction material based on the second clutch transfer function.

14. The method claim 8 further comprising:

in response to the another transmission output shaft torque variability exceeding the predetermined threshold, reducing a slope of the second clutch transfer function and tightening the clutch torque variability specification based on a difference between the another variability and the threshold to generate a third clutch transfer function; and in response to yet another engine-start simulation based on a third clutch transfer function producing yet another transmission output shaft torque variability that is less than the predetermined threshold, configuring a disconnect clutch to exhibit the third clutch transfer function.

* * * * *